Patented June 27, 1933

1,915,925

UNITED STATES PATENT OFFICE

WILLIAM J. COTTON, OF BUFFALO, NEW YORK, ASSIGNOR TO NATIONAL ANILINE & CHEMICAL CO., INC., OF NEW YORK, N. Y., A CORPORATION OF NEW YORK

PROCESS OF MAKING RESORCINOL

No Drawing.   Application filed December 20, 1929.   Serial No. 415,603.

This invention relates to the production of resorcinol (meta-dihydroxybenzene) and, more particularly, to improvements in the production of benzene meta-disulfonic acid and its conversion to resorcinol by fusion with caustic alkali.

One of the general methods employed for the production of resorcinol comprises sulfonating benzene with a large excess of sulfuric acid to produce benzene meta-disulfonic acid; diluting the sulfonation mixture; neutralizing or separating the excess sulfuric acid, and converting the disulfonic acid to its alkali-metal salt; fusing the alkali-metal salt with caustic alkali; diluting the fusion mass; isolating resorcinol; and purifying the resorcinol obtained. The sulfonation step, as usually practiced, results in the production of a mixture containing about 65 to 75 percent of benzene disulfonic acid and about 35 to 25 percent of benzene monosulfonic acid. When this mixture of sulfonic acids is fused with caustic alkali, the benzene monosulfonic acid present is converted to alkali-metal phenolate, which leads to the presence of phenol as an impurity in the resorcinol. For the production of a resorcinol of satisfactory purity the phenol must be separated from the resorcinol. This separation is generally effected by acidifying the fusion mass to convert the alkali-metal resorcinate and the alkali-metal phenolate to the free phenol compounds, extracting the resorcinol and phenol with ether, evaporating off the ether from the extract, and recovering the resorcinol from the ether extract by a fractional distillation. This process is costly in that considerable portions of the benzene and sulfuric acid are consumed in the formation of the undesired benzene monosulfonic acid, that a large excess of sulfuric acid is required, and that the subsequent separation of the resorcinol from the phenol requires a large amount of equipment and labor, and constitutes a serious fire and explosion hazard due to the handling of large quantities of ether.

Various attempts have been made to overcome the difficulties in the above process by reducing the quantity of benzene monosulfonic acid produced, e. g., by conducting the sulfonation with oleum of about 65 percent strength, or with a large excess of oleum or sulfuric acid while applying a high vacuum, or operating at a high temperature, but these processes involve operating difficulties which outweigh whatever advantages they may possess. They have, accordingly, been of little practical benefit.

An object of the present invention is to produce a maximum yield of benzene disulfonic acid by the sulfonation of benzene without the employment of oleum of a high concentration, and/or the employment of a high vacuum, and/or the employment of a high temperature.

Another object of the invention is to produce benzene meta-disulfonic acid by the sulfonation of benzene with sulfuric acid in such an amount and under such conditions that a minimum excess of sulfuric acid is present at the completion of the reaction.

An additional object is to produce benzene meta-disulfonic acid by the sulfonation of benzene under such conditions that the reaction mixture may be directly added to a caustic alkali melt without a preliminary neutralization or removal of any excess acid present.

Still another object of the invention is to produce resorcinol of a high degree of quality in a high yield.

Other objects of the invention will in part be obvious and will in part appear hereinafter.

The invention accordingly comprises the several steps and the relation of one or more of such steps with respect to each of the others thereof which will be exemplified in the process hereinafter disclosed. The scope of the invention will be indicated in the claims.

In the practice of the present invention, the objects thereof are accomplished by sulfonating benzene and/or benzene monosulfonic acid with sulfuric acid in the presence of a sulfonation catalyst and under less drastic operating conditions than were heretofore believed to be necessary. I have found that when the sulfonation is caused to occur in the presence of a sulfonation catalyst, it is not necessary to employ a relatively high vacuum, or an oleum of a relatively high concentration, or a relatively high temperature, or a relatively large excess of sulfuric acid, in order to produce a relatively high yield of benzene meta-disulfonic acid. I have also found that when a relatively small excess of sulfuric acid is used, the sulfonation mixture can be directly mixed with the caustic alkali employed for the conversion of the benzene meta-disulfonic acid to resorcinol by a fusion process. I have furthermore found that the catalyst present in the sulfonation mixture may be left in the sulfonation mass and incorporated with it in the caustic alkali employed for the fusion, since its presence appears to have a beneficial effect in the fusion.

In carrying out the process in accordance with a preferred method of procedure, benzene and/or benzene monosulfonic acid is reacted with sulfuric acid, preferably of a strength in excess of about 96 percent concentration and in the presence of a sulfonation catalyst. The reaction is also preferably carried out under a relatively low vacuum (relatively high absolute pressure) and at a relatively low temperature. The sulfuric acid is also preferably employed in a relatively small excess. Upon completion of the sulfonation, the sulfonation mixture, still containing the catalyst and excess sulfuric acid, may be directly added to molten caustic alkali and fused therewith for the production of resorcinol.

The sulfonation process may be operated with benzene or benzene monosulfonic acid or a mixture thereof; and if benzene monosulfonic acid is employed, it may be produced separately or in conjunction with the disulfonation process. The sulfuric acid generally employed is of a strength in excess of about 100 percent concentration, although an acid of lower concentration may be used, particularly when a vacuum is employed, as the vacuum aids in removing water from the reaction mixture and thereby concentrates the acid. For ease of operation a 30 per cent oleum or less is preferably employed. The sulfuric acid is preferably used in a minimum amount such that there is present at least sufficient sulfur trioxide or sulfuric acid to convert all of the benzene monosulfonic acid and/or benzene present at the beginning of the sulfonation to benzene disulfonic acid, and such that the mass is readily flowable. A preferred maximum amount of oleum is one which results in a finished sulfonation product containing not more than about 10 percent, preferably about 7 to 8 percent, of sulfuric acid or oleum calculated as 100 percent $H_2SO_4$. The disulfonation may be carried out at temperatures of about 245° to 400° C. Temperatures below 280° C. are preferred, however, because of the appreciable formation of undesired sulfones at temperatures above 280° C. When a temperature below about 280° C. is employed, either an oleum of a relatively high concentration (e. g., 45 to 65 per cent) or a vacuum should be used in order to obtain a relatively high yield of benzene meta-disulfonic acid. The use of a vacuum is preferred. The degree of vacuum employed may vary (e. g., absolute pressures as low as 5 inches of mercury may be used); but a relatively high vacuum (relatively low absolute pressure) is not essential. I have found that, even when conducting the process with a relatively weak oleum (e. g., 26 per cent) at a relatively low sulfonation temperature (e. g., 245° to 255° C.) and with only so small an excess of the oleum that the final product contains less than 10 percent of sulfuric acid, calculated as 100 percent $H_2SO_4$, the presence of the catalyst enables the reaction to be carried out with a maximum yield of benzene disulfonic acid at an absolute pressure not below about 15 inches of mercury and generally not below about 20 inches of mercury. It is not necessary to employ the vacuum throughout the entire sulfonation process when a catalyst is used; it need only be applied during the final stage of the process in order to remove from the reaction mixture sufficient water to raise the acid concentration to the point necessary to complete the disulfonation. Among the catalysts which are preferably employed in the process are the compounds of the metals included in the class consisting of mercury and the metals of the first, fifth and sixth groups of the periodic system of classification of the elements. Compounds of this class which are capable of forming a solution or suspension with the sulfuric acid are particularly useful; e. g. the sulfates, oxides, carbonates, etc. of sodium, lithium, potassium, copper, mercury, vanadium, chromium, etc. A preferred catalyst comprises an alkali-metal salt of which the anion contains a metal included in the fifth or sixth groups of the periodic system; e. g., sodium vanadate, potassium chromate, etc. Mixtures of two or more of the compounds also may be used. Catalysts which are particularly useful for the preparation of benzene meta-disulfonic acid comprise mixtures of sodium sulfate, vanadium sulfate, and sodium metavanadate in various proportions. A catalyst which comprises such a mixture in the proportions corresponding with sodium metavanadate is preferred, however, in view of its beneficial effect upon the reaction. The catalyst is preferably incorporated into the reaction mixture in the form of a solution in sulfuric acid.

In carrying out the alkali fusion, the sulfonation mixture resulting from the sulfonation of the benzene monosulfonic acid and/or benzene, preferably while still in molten condition, is added to molten caustic alkali which preferably contains sufficient water to enable it to remain molten at 275° C. The sulfonation mixture may be cooled to some extent before its addition to the molten caustic alkali, in order to mitigate overheating and an excessive rise in temperature of the caustic alkali melt during the addition. The sulfonation mixture preferably should not be cooled to such an extent, however, that it solidifies or ceases to flow readily. Cooling to a temperature of about 100° C. has been found to be satisfactory, and in fact a sulfonation mass such as is produced by the preferred process of the invention when cooled to about 100° C. will produce somewhat of a cooling effect upon the caustic alkali melt. During the addition of the sulfonation mixture, the temperature of the fusion mass may drop gradually, particularly if the sulfonation mixture has been efficiently cooled, but it preferably should not be permitted to fall lower than about 215° C., or else difficulty in stirring the mass will result. After all of the sulfonation mixture has been added, the fusion mass is gradually heated with evaporation of water, care being taken to prevent excessive foaming. The steam generated during the fusion assists in excluding air where its presence is undesirable. The temperature of the mass is permitted to rise to a final reaction temperature of about 305° C. and is maintained at that point till the reaction is complete. The fusion mass may then be added to a sufficient amount of water to dissolve it, and sufficient acid may be added to convert the alkali-metal resorcinate (and any alkali-metal phenolate present) to resorcinol (and phenol). The resorcinol may be recovered from the resulting solution, if desired, by any suitable method. It usually is not necessary, however, to treat the resorcinol by the methods heretofore employed in order to purify it, since it has been found that the resorcinol obtained in accordance with the process hereinbefore described contains so little phenol and is of so high a purity that it may be directly employed in the chemical industry, e. g., for the manufacture of dyestuffs, without further purification. If a purification is desired, however, it may be effected in any suitable manner, e. g., by vacuum distillation of the resorcinol.

As an illustrative embodiment of a manner in which the invention may be carried into practice and of the products produced, the following example is presented: the parts are by weight.

Example

*Preparation of catalyst.*—1.3 parts of sodium sulfate ($Na_2SO_4$, anhydrous) and 2.1 parts of purified ammonium metavanadate are added to about 50 parts of 26 per cent oleum, whereupon a bright orange precipitate is formed. The mixture is heated with frequent stirring to effect complete solution of the precipitate, the solution which is of a red color is cooled, and is then well mixed with about 525 parts of 26 percent oleum.

*Sulfonation of benzene.*—The 575 parts of catalyst-containing oleum, prepared as hereinbefore described, is added to about 200 parts of well agitated benzene while maintaining the temperature at about 28° to 30° C. This will generally require about one hour. After the addition of the oleum to the benzene, the mixture is agitated for about an additional hour without cooling, to complete the formation of benzene monosulfonic acid, the temperature rising spontaneously to about 35° to 40° C. Some benzene disulfonic acid is also produced. The mixture is then heated to about 250° C. and is held at that temperature for about 2 hours. The pressure is then reduced about 10 to 12 inches of mercury (i. e. to an absolute pressure of about 18 to 20 inches of mercury) and heating is continued under the reduced pressure at a temperature of about 245° to 250° C. until the sulfonation is complete (about 2 hours). The mass is then allowed to cool, e. g. to about 100° C. There is thus obtained a mixture comprising about 85 percent or more of benzene disulfonic acid, about 7 per cent or less of benzene monosulfonic acid, and about 8 percent of sulfuric acid calculated as 100 percent $H_2SO_4$.

*Fusion with caustic alkali.*—The cooled sulfonation mass, obtained in accordance with the above described process and containing the sulfonation catalyst, while still in molten condition is slowly run into an agitated mixture consisting of about 840 parts of fused sodium hydroxide and about 25 parts of water, contained in a closed vessel at atmospheric pressure and at a temperature of about 275° C. About 7 hours will be required for the addition. The temperature of the fusion mass will gradually fall during the addition of the sulfonation mixture, but the final temperature preferably should not be less than about 215° C. The melt is then gradually heated to about 305° C., about 4 hours being required, owing to the large volume of steam which is given off and the necessity for preventing excessive foaming. The melt is maintained at about 305° C., for an additional amount of time sufficient to complete the reaction, e. g., about one-half hour, and is then added, while still molten, to sufficient water to dissolve it. The solution is treated with acid (e. g. hydrochloric acid) until it reacts definitely acid toward Congo red paper, the sulfur dioxide is boiled off, and any tar present is then preferably removed. The resulting solution of resorcinol is of a sufficient purity to be directly employed for the manufacture of dyestuffs. If desired, resorcinol may be recovered there-from by evaporation, by distillation under vacuum, or by any of the other known recovery methods. A yield of approximately 95 percent of resorcinol is obtained.

It will be realized that the invention is not limited to the process and the details thereof which are set forth in the foregoing specific example. Thus, the disulfonation process may be carried out with benzene, with benzene monosulfonic acid, or with a mixture of benzene and benzene monosulfonic acid, prepared in any suitable manner. The catalyst may be any of the catalysts hereinbefore described, but a solution of sodium metavanadate in sulfuric acid, or a mixture of sodium and vanadium sulfates in the proportion corresponding with sodium metavanadate, is preferred. The catalyst need not be prepared in the above manner and need not be added in the manner and at the stage of the process illustrated, it being only necessary that the catalyst be present during the disulfonation process. The disulfonation may be carried out at other temperatures than 250° C., for example, 245° to 275° C., but a temperature of about 245° to 255° C. is preferred. The concentration and amount of sulfuric acid employed may also vary, as has been indicated above. About 275 to 300 parts of 26 percent oleum per 100 parts of benzene has been found to be particularly suitable for practical operation, however. The sulfonation may be carried out under vacuum for the entire reaction period, or only during the final portion of the disulfonation. The degree of vacuum employed may vary, the minimum vacuum used preferably being that sufficient to concentrate the sulfuric acid to that strength necessary to complete the disulfonation in the presence of the particular catalyst employed. The extent to which the sulfonation mass is cooled after the completion of the disulfonation may also vary, as above pointed out.

The caustic alkali need not contain water, but the presence of water is desirable as it lowers the fusing point of the caustic alkali. Too much water should be avoided, however, because it must be subsequently distilled off in bringing the fusion mass up to the final reaction temperature. The fusion temperature may vary, the temperature used depending upon the relative amount of caustic alkali employed. Temperatures as high as about 400° C. may be employed with a sufficiently low excess of caustic alkali. The caustic alkali fusion process need not be carried out in the manner above described. For example, the sulfonation mixture, after the completion of the sulfonation, may be intimately mixed in solid form with a small excess above the theoretical amount of solid caustic alkali (e. g., in a ball mill) and the mixture may then be spread in a relatively thin layer (e. g., in pans) and baked at a suitable temperature, e. g., 400° C., while excluding air. In isolating the resorcinol from the fusion mass, other acids may be employed to acidify the solution, e. g., sulfuric acid.

The invention thus affords a method whereby benzene disulfonic acid may be produced by a sulfonation process without necessitating the employment of oleum of relatively high concentration, or relatively high temperatures, or relatively low absolute pressures, or a relatively large excess of acid; it eliminates the necessity of removing, or neutralizing with an alkaline solution, the residual sulfuric acid at the completion of the sulfonation; it makes possible the addition of the sulfonation reaction mixture, without any intermediate treatment and while still molten, directly to the caustic alkali melt for fusion therewith; and it results in the production of benzene disulfonic acid in a higher yield than has heretofore been obtainable.

Since in carrying out the above process certain changes may be made without departing from the scope of the invention, it is intended that all matter contained in the above description shall be interpreted as illustrative and not in a limiting sense, except as limited by the claims.

It is to be understood that the expression "sulfuric acid", occurring in the description and claims, is used in a generic sense unless otherwise indicated, and includes oleum, and that the expression "weak oleum" as used in the claims means oleum having a so-called free $SO_3$ concentration not exceeding 45 percent.

I claim:

1. The process which comprises reacting benzene with weak oleum in the presence of a sulfonation catalyst, and heating the reaction mixture at a sulfonation temperature not exceeding 280° C. and at a subatmospheric pressure not less than 15 inches of mercury absolute pressure.

2. The process which comprises reacting benzene with weak oleum in the presence of a salt which contains a metal included in the group consisting of vanadium and chromium, as a sulfonation catalyst, to produce benzene monosulfonic acid, and heating the resulting reaction mixture at a temperature of 245° to 255° C. and at a subatmospheric pressure not less than 15 inches of mercury absolute pressure.

3. The process which comprises sulfonating benzene monosulfonic acid in the presence of a sulfonation catalyst and with sulfuric acid in such an amount that the finished sulfonation mixture contains not more than 10 percent of sulfuric acid calculated as 100 percent sulfuric acid, mixing the resulting sulfonation mass with caustic alkali, and fusing said mixture to produce resorcinol.

4. The process which comprises sulfonating benzene monosulfonic acid in the presence of a compound of a metal selected from the group consisting of lithium, sodium, potassium, copper, mercury, vanadium and chromium, as a sulfonation catalyst, with such an amount of oleum that the finished sulfonation mixture contains not more than 10 percent of oleum calculated as 100 percent sulfuric acid, adding the resulting sulfonation mass, while still in molten condition, to caustic alkali, and fusing said mixture to produce resorcinol.

5. In the sulfonation of benzene monosulfonic acid with sulfuric acid for the production of benzene meta-disulfonic acid, the improvement which comprises carrying out the sulfonation with sulfuric acid of a strength not less than 96 percent, at a temperature between 245 and 400° C. and at a subatmospheric pressure greater than 5 inches of mercury absolute pressure.

6. In the sulfonation of benzene monosulfonic acid with sulfuric acid for the production of benzene meta-disulfonic acid, the improvement which comprises carrying out the sulfonation with sulfuric acid of a strength not less than 96 percent, and at a temperature between 245° and 400° C., the amount of sulfuric acid employed being such that at the completion of the sulfonation the concentration of sulfuric acid is less than 10 percent calculated as 100 percent sulfuric acid.

7. In the sulfonation of benzene monosulfonic acid with sulfuric acid for the production of benzene meta-disulfonic acid, the improvement which comprises carrying out the sulfonation with sulfuric acid of a strength not less than 100 percent, at a subatmospheric pressure greater than 5 inches of mercury absolute pressure, and in the presence of a compound of a metal selected from the class consisting of mercury and the metals of the first, fifth, and sixth groups of the periodic system as a sulfonation catalyst.

8. In the sulfonation of benzene monosulfonic acid with sulfuric acid for the production of benzene meta-disulfonic acid, the improvement which comprises carrying out the sulfonation with sulfuric acid of a strength not less than 96 percent, at a temperature between 245° and 400° C., at a subatmospheric pressure greater than 5 inches of mercury absolute pressure, and in the presence of a sulfonation catalyst, the amount of sulfuric acid employed being such that at the completion of the sulfonation the concentration of sulfuric acid does not exceed 10 percent calculated as 100 percent sulfuric acid.

9. In the sulfonation of benzene monosulfonic acid with sulfuric acid for the production of benzene meta-disulfonic acid, the improvement which comprises carrying out the sulfonation with sulfuric acid of a strength not less than 100 percent, at a sulfonation temperature below 280° C., and at a subatmospheric pressure not less than 15 inches of mercury absolute pressure.

10. In the sulfonation of benzene monosulfonic acid with sulfuric acid for the production of benzene meta-disulfonic acid, the improvement which comprises carrying out the sulfonation with sulfuric acid of a strength not less than 100 percent, and at a subatmospheric pressure not less than 15 inches of mercury absolute pressure, the amount of oleum employed being such that at the completion of the sulfonation the concentration of sulfuric acid does not exceed 8 percent calculated as 100 percent sulfuric acid.

11. In the sulfonation of benzene monosulfonic acid with sulfuric acid for the production of benzene meta-disulfonic acid, the improvement which comprises heating benzene monosulfonic acid mixed with benzene at a temperature of 245°–255° C., with weak oleum, at a subatmosphere pressure greater than 5 inches of mercury absolute pressure, and in the presence of a mixture of sodium sulfate, sodium metavanadate, and vanadium sulfate, as a sulfonation catalyst, the amount of sulfuric acid employed being such that at the completion of the sulfonation the concentration of sulfuric acid does not exceed 10 percent calculated as 100 percent sulfuric acid.

12. In the sulfonation of benzene monosulfonic acid with sulfuric acid for the production of benzene meta-disulfonic acid, the improvement which comprises carrying out the sulfonation with sulfuric acid of a strength included within the range 96 percent sulfuric acid to 30 percent oleum, and at a subatmospheric pressure greater than 5 inches of mercury absolute pressure, the amount of sulfuric acid employed being such that at the completion of the sulfonation the concentration of sulfuric acid is less than 10 percent calculated as 100 percent sulfuric acid.

13. In the sulfonation of benzene monosufonic acid with sulfuric acid for the production of benzene meta-disulfonic acid, the improvement which comprises carrying out the sulfonation with sulfuric acid of a strength included within the range 100 percent sulfuric acid to 30 percent oleum, at a sulfonation temperature below 280° C., and in the presence of a sulfonation catalyst.

14. In the sulfonation of benzene monosulfonic acid with sulfuric acid for the production of benzene meta-disulfonic acid, the improvement which comprises carrying out the sulfonation with sulfuric acid of a strength included within the range 100 percent sulfuric acid to 30 percent oleum, in the presence of a compound of a metal selected from the group consisting of lithium, sodium, potassium, copper, mercury, vanadium and chromium as a sulfonation catalyst, the amount of sulfuric acid employed being such that, at the completion of the sulfonation, the concentration of sulfuric acid is less than 10 percent calculated as 100 percent sulfuric acid.

15. In the sulfonation of benzene monosulfonic acid with sulfuric acid for the production of benzene meta-disulfonic acid, the improvement which comprises carrying out the sulfonation with sulfuric acid of a strength included within the range 100 percent sulfuric acid to 30 percent oleum, at a temperature between 245° and 275° C., inclusive, and in the presence of a sulfonation catalyst.

16. In the sulfonation of benzene monosulfonic acid with sulfuric acid for the production of benzene meta-disulfonic acid, the improvement which comprises heating benzene monosulfonic acid mixed with benzene at a temperature of 245°–255° C., with oleum of about 26 percent strength, at an absolute pressure between 15 and 20 inches of mercury, and in the presence of sodium metavanadate as a catalyst, the amount of oleum employed being such that at the completion of the sulfonation the concentration of sulfuric acid does not exceed 8 percent calculated as 100 percent sulfuric acid.

17. In the sulfonation of benzene monosulfonic acid with sulfuric acid for the production of benzene meta-disulfonic acid, the improvement which comprises carrying out the sulfonation at a temperature between 245° and 275° C., inclusive, and at a subatmospheric pressure not less than 15 inches of mercury absolute pressure with an amount of oleum such that at the ompletion of the sulfonation the concentration of sulfuric acid does not exceed 8 percent calculated as 100 percent sulfuric acid.

18. In the sulfonation of benzene monosulfonic acid with sulfuric acid for the production of benzene meta-disulfonic acid, the improvement which comprises carrying out the sulfonation at a temperature below 280° C., at a subatmospheric pressure greater than 5 inches of mercury absolute pressure, and in the presence of a compound of a metal selected from the group consisting of lithium, sodium, potassium, copper, mercury, vanadium and chromium as a sulfonation catalyst.

19. In the sulfonation of benzene monosulfonic acid with sulfuric acid for the production of benzene meta-disulfonic acid, the improvement which comprises carrying out the sulfonation at a temperature below 280° C., and in the presence of a sulfonation catalyst, the amount of sulfuric acid employed being such that, at the completion of the sulfonation, the concentration of sulfuric acid is less than 10 percent calculated as 100 percent sulfuric acid.

20. In the sulfonation of benzene monosulfonic acid with sulfuric acid for the production of benzene meta-disulfonic acid, the improvement which comprises carrying out the sulfonation at a temperature below 280° C., at a subatmospheric pressure greater than 5 inches of mercury absolute pressure, and in the presence of a sulfonation catalyst.

21. In the sulfonation of benzene monosulfonic acid with sulfuric acid for the production of benzene meta-disulfonic acid, the improvement which comprises carrying out the sulfonation with sulfuric acid of a strength included in the range 96 percent sulfuric acid to 30 percent oleum, and in the presence of a sulfonation catalyst, the amount of sulfuric acid employed being such that at the completion of the sulfonation the concentration of sulfuric acid is less than 10 percent calculated as 100 percent sulfuric acid.

22. In the sulfonation of benzene monosulfonic acid with sulfuric acid for the production of benzene meta-disulfonic acid, the improvement which comprises carrying out the sulfonation at a temperature included in the range 245° to 400° C., at a subatmospheric pressure greater than 5 inches of mercury absolute pressure, and in the presence of a sulfonation catalyst, the amount of sulfuric acid employed being such that at the completion of the sulfonation the concentration of sulfuric acid is less than 10 percent calculated as 100 percent sulfuric acid.

23. In the sulfonation of benzene monosulfonic acid with sulfuric acid for the production of benzene meta-disulfonic acid, the improvement which comprises heating benzene monosulfonic acid mixed with benzene at a temperature between 245° and 275° C., inclusive, at an absolute pressure of 15 to 20 inches of mercury and in the presence of an alkali-metal salt the anion of which contains a metal selected from the fifth and sixth groups of the periodic system as a sulfonation catalyst, the amount of sulfuric acid employed being such that at the completion of the sulfonation the concentration of sulfuric acid is less than 10 percent calculated as 100 percent sulfuric acid.

24. The process which comprises treating 1.3 parts of sodium sulfate, 2.1 parts of ammonium metavanadate and 575 parts of 26 percent oleum to form a solution, mixing said solution with 200 parts of benzene while maintaining the temperature at 28° to 30° C., heating the mixture at 40° C. to form benzene monosulfonic acid, raising the temperature to 240° C., lowering the absolute pressure to 18 to 20 inches of mercury, and continuing the reaction until disulfonation of the benzene is completed.

25. The process which comprises treating 1.3 parts of sodium sulfate, 2.1 parts of ammonium metavanadate and 575 parts of 26 percent oleum to form a solution, mixing said solution with 200 parts of benzene while maintaining the temperature at 28° to 30° C., heating the mixture at 40° C. to form benzene monosulfonic acid, raising the temperature to 240° C., lowering the absolute pressure to 18 to 20 inches of mercury, continuing the reaction until disulfonation of the benzene is completed, cooling the mass to 100° C., running it slowly into a mixture of about 840 parts of fused sodium hydroxide and 25 parts of water having a temperature of 275° C., heating the melt to 305° C., dissolving the melt in water, and treating with an acid to produce resorcinol.

In witness whereof, I have hereunto set my hand.

WILLIAM J. COTTON.